US008834597B1

United States Patent
Han et al.

(10) Patent No.: US 8,834,597 B1
(45) Date of Patent: Sep. 16, 2014

(54) COPPER NANOWIRE PRODUCTION FOR INTERCONNECT APPLICATIONS

(75) Inventors: Jin-Woo Han, San Jose, CA (US); Meyya Meyyappan, San Jose, CA (US)

(73) Assignee: The United Stated of America as Represented by the Administrator of the National Aeronautics & Space Administration (NASA), Washington, DC (US)

( * ) Notice: Subject to any disclaimer, the term of this patent is extended or adjusted under 35 U.S.C. 154(b) by 194 days.

(21) Appl. No.: 13/485,721

(22) Filed: May 31, 2012

(51) Int. Cl.
C22B 15/00 (2006.01)
B82Y 10/00 (2011.01)
H01J 1/00 (2006.01)
H01J 1/304 (2006.01)

(52) U.S. Cl.
CPC .............. B82Y 10/00 (2013.01); H01J 1/3048 (2013.01); *Y10S 977/762* (2013.01)
USPC .................. 75/369; 75/641; 419/24; 977/762

(58) Field of Classification Search
CPC ........ B82Y 10/00; H01J 1/3048; H01J 1/025; C22B 15/0021
USPC ...................... 75/641, 369; 419/24; 977/762
See application file for complete search history.

(56) References Cited

U.S. PATENT DOCUMENTS

| 6,803,260 B2 | 10/2004 | Shin et al. |
| 6,858,318 B2 | 2/2005 | Kogiso et al. |
| 7,217,650 B1 | 5/2007 | Ng et al. |
| 2004/0147049 A1* | 7/2004 | Lee et al. .......... 438/20 |
| 2009/0291302 A1 | 11/2009 | Shimotsuma et al. |
| 2012/0061124 A1* | 3/2012 | Cui et al. .......... 174/128.1 |

FOREIGN PATENT DOCUMENTS

| CN | 10164923 A | * | 9/2008 |
| CN | 102051675 A | * | 5/2011 |

OTHER PUBLICATIONS

Machine translation of CN 102051675 A published May 2011.*
Machine translation of CN 101264923 A published Sep. 2008.*
Han, et al., Evolutional Transformation of Copper Oxide Nanowires to Copper Nanowires by a Reduction Technique, Materials Express, Jun. 1, 2011, 176-180, 1-2, American Scientific Publishers, USA.

* cited by examiner

*Primary Examiner* — George Wyszomierski
*Assistant Examiner* — Tima M McGuthry Banks
(74) *Attorney, Agent, or Firm* — John F. Schipper; Christopher J. Menke; Robert M. Padilla

(57) ABSTRACT

A method of fabricating metallic Cu nanowires with lengths up to about 25 μm and diameters in a range 20-100 nm, or greater if desired. Vertically oriented or laterally oriented copper oxide structures (CuO and/or $Cu_2O$) are grown on a Cu substrate. The copper oxide structures are reduced with 99+ percent H or $H_2$, and in this reduction process the lengths decrease (to no more than about 25 μm), the density of surviving nanostructures on a substrate decreases, and the diameters of the surviving nanostructures have a range, of about 20-100 nm. The resulting nanowires are substantially pure Cu and can be oriented laterally (for local or global interconnects) or can be oriented vertically (for standard vertical interconnects).

9 Claims, 3 Drawing Sheets

COPPER NANOWIRE PRODUCTION FOR INTERCONNECT APPLICATIONS

ORIGIN OF THE INVENTION

This invention was made, in part, by one or more employees of the U.S. government. The U.S. government has the right to make, use and/or sell the invention described herein without payment of compensation, including but not limited to payment of royalties.

FIELD OF THE INVENTION

This invention relates to fabrication of metallic Cu nanowires with diameters as small as about 20 nm.

BACKGROUND OF THE INVENTION

Copper replaced aluminum nearly two decades ago as interconnect material in integrated circuit manufacturing, because of its better electrical conductivity. The size of the interconnect wire has been steadily decreasing as Moore's law has affected successive feature size generations. The diameter of the interconnect structure is expected to decrease further as silicon technology passes through additional generations. Alternatives to copper have been reported, notably, materials such as carbon nanotubes. The success has been limited, and carbon nanotubes have not yet been integrated into manufacturing practice. Most reports focused on providing vertical interconnects (vias) with multiwalled carbon nanotubes or carbon nanofibers for DRAM applications. Further, it is difficult to utilize carbon nanotubes for horizontally oriented local and global interconnects. It appears that standard copper will remain the preferred interconnect material for some time to come, if efficient methods to produce small diameter copper wires can be found.

What is needed is a method for reliably fabricating Cu nanowires with diameters as small as about 20 nm. Preferably, the method should rely, at least in part, upon techniques that are understood by workers in nanowire construction.

SUMMARY OF THE INVENTION

These needs are met by the invention, which initially produces copper oxide nanowires with controllable diameters as small as about 20 nm. These nanowires are chemically reduced by exposure to a vapor of H and/or $H_2$ molecules, which reduces the nanowire diameters through displacement or removal of the O and/or $O_2$ atoms and molecules present in the starting material. Reasonably complete reduction of the copper oxide is implemented by provision of nanowires with small diameters that do not require diffusion of H and $H_2$ molecules across hundreds of layers of copper oxide molecules.

DETAILED DESCRIPTION OF THE INVENTION

A desired diameter of the nanowires for interconnects will be in a range 16-100 nm. These small diameter nanowires cannot be produced by etching of bulk metallic copper or of a thin film of copper, because metallic copper is very difficult to etch using a plasma, and wet etching is difficult to control. However, the initial copper oxide nanowires can be produced directly. For example, one major approach uses a template, with anodized alumina template being the most popular. In any such template, copper is deposited using an electrochemical approach. The template pore size may be tailored to produce nanowires of a particular diameter or range of diameters. A disadvantage of the template approach is the need to remove the template material carefully to reveal the copper nanowires without damaging the nanowires. This is rather difficult. An alternative technique is needed, which is provided by the invention.

Figure 1:
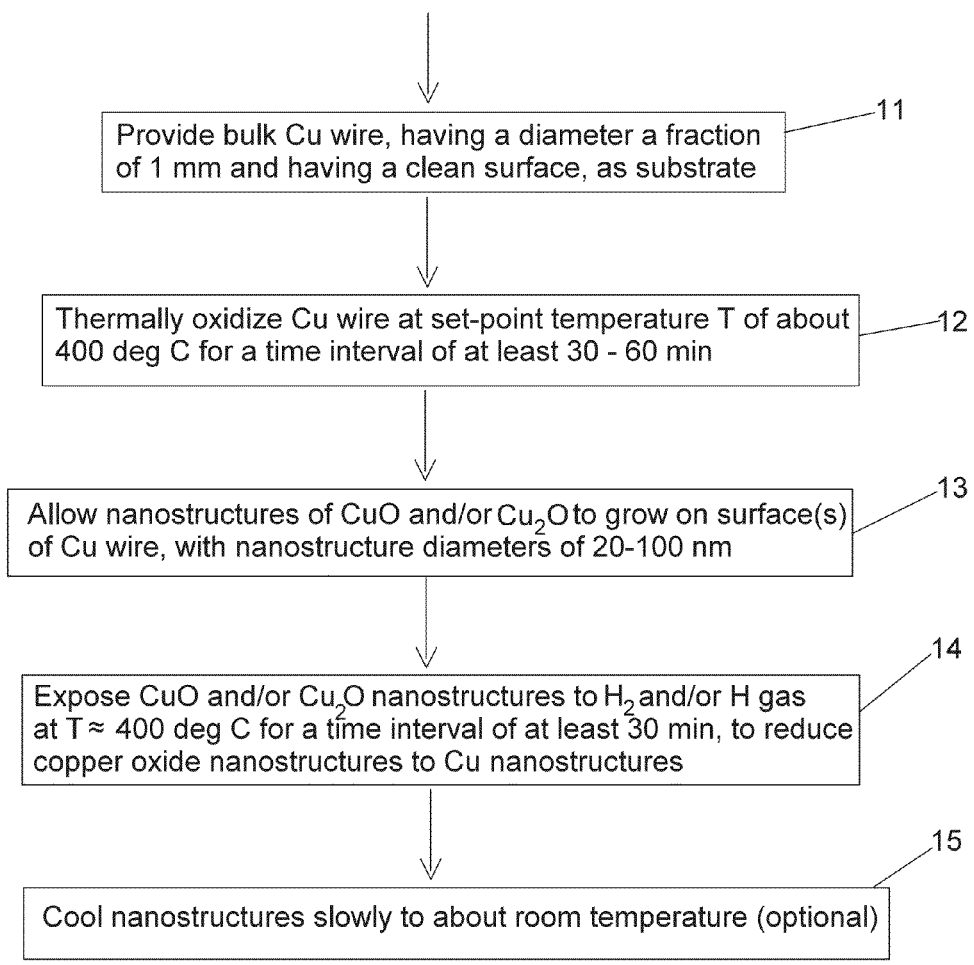
FIG. 1 is a flow chart of a procedure to practice the invention.

FIG. 1 is a flow chart of a procedure for practicing the invention. In step 11, clean bulk Cu wire is provided, as a substrate and as a source of precursors, with diameter no more than about 1 mm In step 12, the Cu wires are thermally oxidized at a set-point temperature of about T=400° C., for a time interval length at least 30 min, or longer if desired. In step 13, the action taken in step 12 causes growth of nanostructures of CuO and/or $Cu_2O$ from the oxidized Cu material, which are substantially vertically oriented or laterally oriented and have a range of diameters 20-100 nm. In step 14, the CuO and/or $Cu_2O$ nanostructures are exposed to $H_2$ and/or H gas (preferably 99.99 percent pure) in the same furnace for about 30 min, or longer if desired, again at a temperature T of about 400° C., to reduce the CuO and/or $Cu_2O$, material to metallic Cu, with a corresponding reduction in volume. In step 15 (optional), the temperature is slowly decreased to about room temperature. The reduced nanostructures have representative diameters of 20-100 nm, or less if desired, and lengths up to about 25 μm. Where a full array of Cu nanostructures is present on the remaining surface of the substrate, the surface becomes darkened, as compared with an original lighter color of the surface.

Copper oxide nanostructures (CuO and $Cu_2O$) from copper film, foil, or millimeter-size wires are commercially available, through thermal oxidation using a vapor phase technique. The copper oxide nanostructures are chemically reduced in a hydrogen atmosphere to produce the metallic copper nanowires.

Metallic nanowires have interesting physical properties such as quantized conductance and localization effects. (M. Meyyappan and M. K. Sunkara, *Inorganic Nanowires: Applications, Properties and Characterization*, CRC Press, Boca Raton, Fla. (2010)) These properties can be exploited for applications such as wiring in nanometer scale circuits, probes for an atomic force microscope, and scanning tunneling microscope. Among metals, copper is of particular interest because of its high thermal and electrical conductivity. Copper nanowires have been demonstrated for infrared polarizer, interconnects, and templates for surface-enhanced Raman scattering (SERS). Several synthesis techniques for Cu nanowires have been reported, but the most common approach uses a template in a chemical or electrochemical process. Previous works include complex surfactant-assisted hydrothermal reduction, DNA-templated synthesis, vapor deposition, reduction of $CuCl_2$ with $(Me_3Si)_4Si$ in a sealed tube, and reduction of $(KI)_{1.5}(CuI)_{8.5}$ using a direct current electric field.

Many of the aforementioned synthesis techniques require expensive chemicals, complicated procedures, and complex fabrication equipment, which may preclude use of these techniques for mass production. In addition, template techniques will require a gentle way to remove the template without damage to the nanostructures prior to integration in the process sequence for a specific application. A simple and inexpensive synthesis approach is presented for direct growth of semiconducting CuO and $Cu_2O$ nanostructures and their reduction to metallic Cu nanowires, as indicated in FIGS. 2A-2I. Both CuO and $Cu_2O$ were produced in a simple quartz tube furnace system. Oxidation was performed in ambient air, and the reduction was implemented in a hydrogen environment. The $H_2$ reduction approach is frequently used in catalysis and to form electronic devices. Hydrogen reduction of CuO and $Cu_2O$ films and powders is well known, but phase transformation of nanostructures through this process has not been reported before. In this work, CuO and $Cu_2O$ nanostructures are first produced on Cu substrate using a previously reported method, and a reduction process is performed to convert the material to metallic Cu nanowires. The development mechanisms of these nanowires have been studied by examining the sequential images of nanostructures at different time intervals during the reduction process. The nanowires are characterized using scanning electron microscopy (SEM), energy-dispersive X-ray spectroscopy (EDX), X-ray diffraction (XRD), and electrical current-voltage (I-V) measurements.

Copper wires are used as a substrate, and also as a precursor, in forming the copper oxide nanostructures. No extrinsic catalysis is involved (Meyyappan et al, ibid). After the thermal oxidation, the entire surface of Cu wire was covered with a dense array of oxide nanowires, oriented approximately normal to the surface of the substrate. The forest-like nanowire array has very low optical reflectivity and correspondingly high absorption of visible light. The array thus appears black when viewed by naked eye. This optical property and the semiconducting nature of the oxide nanostructures are useful for applications such as photodetectors and solar cells. When the reduction process is completed, the nanowires appear to be shorter and wider, and the originally straight wires now manifest a wavy structure. The nanowire density decreases in the reduction process so that the color of the metallic Cu nanowires is closer to that of metallic Cu. The evolutional schematics of Cu nanowire from generation to termination are indicated in FIGS. 2A-2I. Detailed discussion is given in the following with the aid of SEM images.

Figure 2A:
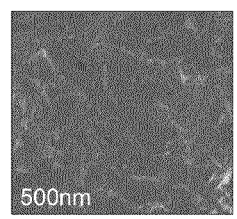
FIGS. 2A-2I are a timeline of SEM images of modification (through reduction) of an array of CuO and $Cu_2O$ nanowires with $H_2$ and transformation to an array of Cu nanowires.
Figure 2B:
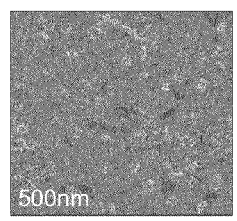
Figure 2C:
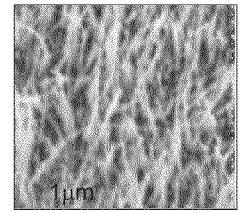
Figure 2D:
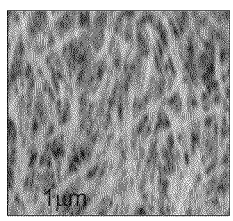
Figure 2E:
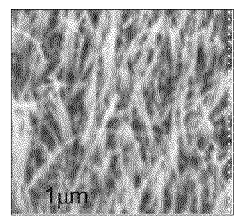
Figure 2F:
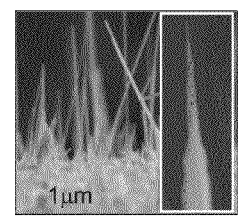
Figure 2G:
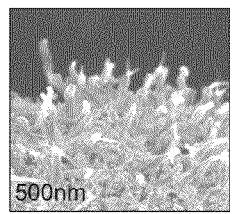
Figure 2H:
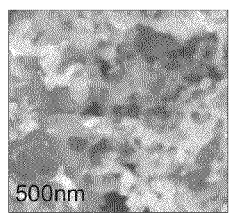
Figure 2I:
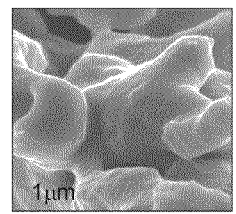

FIGS. 2A-2I are a timeline sequence of SEM images of modification (through reduction) of an array of CuO and $Cu_2O$ nanostructures with $H_2$ and transformation to an array of Cu nanowires. In order to investigate the effect of processing temperature, various set-point temperatures of 300, 400, 500, and 600° C., were investigated. No nanostructures were grown at 300° C. The temperature range from 400 to 600° C. resulted in similar nanostructures, and no strong relation can be found between the diameters and the temperatures. As a representative condition, SEM images for the time evolution of nanowires grown at 600° C. are shown in FIG. 2A. As the heating proceeds (e.g., at atmospheric pressure) towards the set point of 600° C., CuO film begins to grow on the Cu surface. Growth with a set-point temperature below 600° C., appears to favor formation of CuO, rather than $Cu_2O$, on the Cu surface. The film surface morphology roughens and the surface exhibits micron-sized facets with random angles (a2). The neighboring facets form a sharp triagonal or tetragonal pyramidal structure. Nucleation occurs at the pyramidal peaks where the Gibbs free energy is thermodynamically at its minimum.

Interestingly, the nuclei appear to be square-shaped with a flat top (a3), which is attributed to the four-fold symmetry of the CuO plane. The nuclei, which have width and height ranging from 20 to 100 nm, serve as catalyst seeds. The nanowires begin to grow after formation of the nuclei. Whereas the length of the nanowires increases with the growth time, the nanowire width is not strongly dependent on the growth time. Nanowire diameter seems to be limited by the size of the initial self-catalyst seed. Typically, the nanowires have diameters below 100 nm with lengths up to 25 µm. The nanowires initially grow rapidly, followed by a rapid attenuation in the growth rate as a critical length of 20 µm is approached.

When the oxide film becomes thick, the thermally activated metal cations are no longer energetic enough to migrate. The experimental results show that the lengths of the nanostructures saturate around 25 µm at a total reaction time of about 30 min, and there is no noticeable growth after 30 min up to 3 hours. Otherwise stated, the reaction time of about 30 min is enough to fully grow the nanowires. The nanowires can be a mixture of CuO and $Cu_2O$. When copper is oxidized in air, two-step oxidation is available: $4Cu+O_2 \rightarrow 2Cu_2O$ and $2Cu_2O+O_2 \rightarrow 4CuO$. $Cu_2O$ is grown first with a Cu precursor, and CuO is formed next with $Cu_2O$ precursor.

FIGS. 2A-2D are a sequence of SEM images illustrating a timeline for synthesizing CuO and $CuO_2$ nanowires. FIGS. 2F-2I are a sequence of SEM images illustrating reduction of CuO and $Cu_2O$ nanowires with H and/or $H_2$ and transformation of the copper oxide nanowires to Cu nanowires, sometimes accompanied by shortening in length and/or increase in diameter.

Figure 3A:
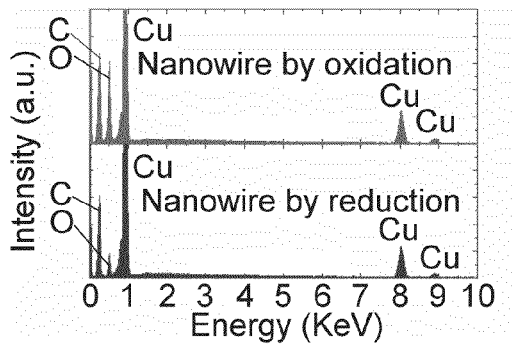
FIGS. 3A and 3B are graphical views of electron diffraction intensity and X-ray diffraction intensity for a CuO and $Cu_2O$ and for a Cu array, before and after the transformation indicated in FIGS. 2A-2I.
Figure 3B:
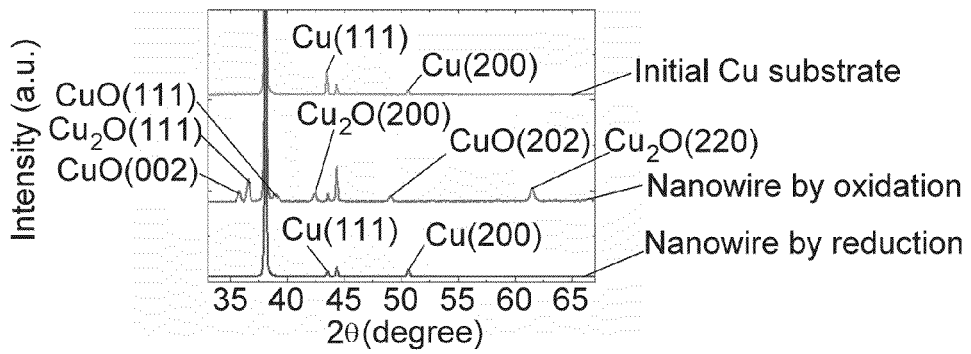

FIGS. 3A and 3B are graphical views of electron diffraction (ERD) intensity and X-ray diffraction (XRD) intensity for a CuO and $Cu_2O$ and for a Cu array, before and after the material transformation discussed here.

The reduction of metal oxides with $H_2$ is a fundamental and widely used method. Both CuO and $Cu_2O$ nanostructures can react with $H_2$ and release $H_2O$ at elevated temperatures. $Cu_2O$ can be directly transformed to metallic Cu by a reaction such as $Cu_2O+H_2 \rightarrow 2Cu+H_2O$;. In contrast, CuO follows a two-step reduction process: CuO is first reduced to $Cu_2O$ by a reaction such as $2CuO+H_2 \rightarrow Cu_2O+H_2O$, and $Cu_2O$ is then reduced to Cu. When an oxide material is reduced, a shrinkage of its volume and size usually occurs. In the present work, nanostructures with width less than 10~40 nm have apparently disappeared after the reduction process; only the thicker nanostructures survive the process.

Interestingly, the average height of the surviving nanostructures is reduced and the tops of nanostructures become sharper (b2), resembling a pencil. This implies that the reduction process begins near the top, and that Cu cations may migrate toward the sidewall as the reduction process continues. Also, thinner oxide nanostructures complete the reduction process earlier than do the thicker nanostructures. As the reduction process continues, the heights of all the nanostructures become less than 500 nm, and the mechanical strain gradient makes the straightened structures wavy (b3). With further increase in time, all nanostructures are terminated, and the surface of the substrate becomes bumpy (b4).

An elemental analysis was carried out by using EDX, as shown in FIG. 3A, and the peaks in the EDX spectrum consist of carbon, oxygen, and copper. A carbon peak is attributed to the graphite film from the mounting specimens. Although the intensity of an oxygen peak is significantly decreased after completing the reduction process, a small fraction of oxygen remains. Because oxygen peak can arise from contamination and residual gases in the EDX chamber, the reduced nanostructure was also investigated by XRD, in order to clarify the chemical bonding structure, as shown in FIG. 3B. $Cu_2O$ and CuO peaks appear after the oxide nanowires are grown. The XRD spectrum of the reduced nanostructures returns to that of the initial Cu, and the signature of Cu—O bonding no longer remains. In addition, the signature of a paramelaconite $Cu_4O_3$ phase is found in all nanowire samples because this phase is metastable.

According to a pressure-temperature phase diagram of a Cu—O system, the growth conditions of atmospheric pressure and temperature below 600° C. will favor CuO relative to $Cu_2O$. However, we found a comparable population of both types, with no dominant stoichiometry. Process refinements, such as control of the temperature, control of reaction time, control of temperature change rate or post-annealing process, may modify the mixture composition as was shown in the synthesis of powder materials.

Figure 4:
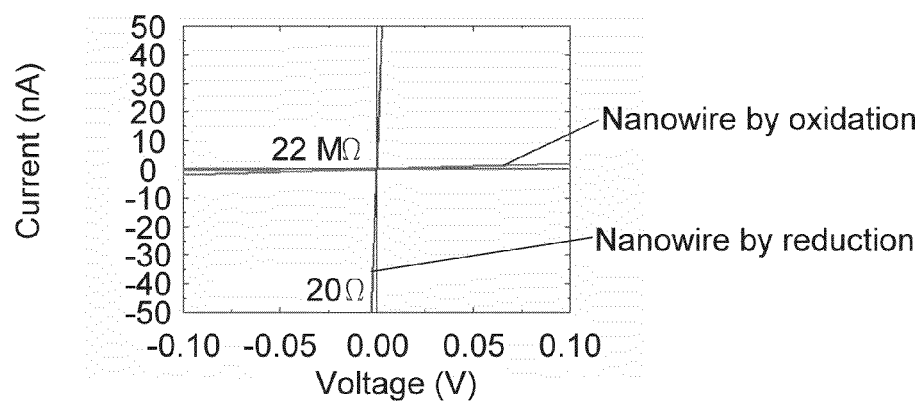
FIG. 4 graphically presents I-V electrical characteristics of a CuO or $Cu_2O$ nanowire and of a Cu nanowire, before and after the reduction process.

The electrical resistance of the nanostructure samples before and after reduction is shown in FIG. 4. Two wires surrounded nanowires were contacted with one another and I-V characteristics were measured. The contact area was 1 mm×1 mm. The resistance of the parallel nanostructures radically decreases, by six orders of magnitude, after the reduction process, which indicates that the reduced nanostructures are reasonably metallic. When a nanowire diameter is comparable to or smaller than the electron mean free path within the material, then a decrease in surface scattering can increase the conductance of wiring. For future interconnects needs, carbon nanotubes ("CNTs") have been widely investigated. However, the CNTs have been mostly grown vertically for use in DRAM applications. In contrast, Cu nanowires can be grown either vertically or laterally for use in vertical via as well as for local and global interconnects.

Additional Experimental Details

The synthesis of copper oxide nanowire is based on a vapor-phase growth, which involves thermal oxidation of bulk copper wires in ambient air. Conventional electrical Cu wires with 99.99 percent purity and 0.1 mm diameter were used as starting material. The surface of the wire was cleaned in 100 percent methanol and rinsed in deionized water, both under ultrasonic bath at room temperature for 10 min. After the sample was blow-dried, the sample was immediately heated to a set-point temperature in a quartz tube furnace. Ambient air was employed for oxidation. The ramp time to the set temperature was 30 min., and the isothermal regime lasted 60 min. When the sample was cooled down rapidly, the resulting thermal stress caused one or more cracks to develop on the surface. Therefore, the furnace was allowed to cool naturally in ambient air to room temperature to avoid any fracture. We performed the reduction step using the same furnace system to transform the oxide nanowire into metal nanowire. There was no chemical treatment between oxidation and reduction process. The metal-oxide nanowire was heated under a temperature ramp time of 20 min. 99.99 percent $H_2$ gas as supplied was used as the reduction agent. After the temperature reached 400° C., isothermal condition was maintained for 30 min. In the XRD experiment, 40 substantially parallel substrates (wires) were tightly attached on a single crystal silicon wafer in order to facilitate the beam alignment. To measure the I-V characteristics, two substrates were contacted to each other. The surfaces at one end of each substrate were stripped off using sand paper. The inner metal wire, Cu, was then exposed. Current and voltage signals were transmitted through the inner metal.

Production of nanowires of copper oxide (CuO or $Cu_2O$) is known and can be implemented by several different processes, but a method for further processing of these nanowires to provide metallic copper, including any appropriate phase transformations, has not been reported before. Metallic copper, with higher electrical conductivity, replaced aluminum in semiconductor applications beginning about two decades ago. However, production of copper with diameters no greater than about 0.1 µm has been problematical, because tight control of copper wire diameters has not been available. A procedure for growing copper nanowires with diameters 20-100 nm and allowing reasonably firm control of diameter and length is desirable.

Copper wire has been used as a substrate, and also as a precursor. Nanowire growth here is based on a self-catalytic mechanism. After thermal oxidization, the Cu wire is covered with a dense array of Cu oxide segments, oriented approximately perpendicular to the original Cu surface. Two features of this forest of Cu oxide segments are: (1) low optical reflectivity; and (2) presence of some semiconducting behavior, with correspondingly high absorption of visible light incident on the array. The surface appears black or opaque when viewed by a human eye. This configuration is suitable for photodetectors and solar cells. The array is chemically reduced using hydrogen gas, which may also induce a phase transformation adjacent to the nanowire surface(s). The individual nanowires in the array often appear to have decreased length and increased diameter, and the nanowire areal density is reduced.

Several set-point temperatures (T=300° C., 400° C., 500° C. and 600° C.) were used for nanowire fabrication. No nanowires grew at T=300° C., but each of the other set-point temperatures permitted growth with similar nanowire structures, with no correlation observed between varying temperatures and nanowire diameters. Use of progressively higher temperatures appears to promote growth of CuO, to produce increasingly roughened surfaces and appearance of triangular and tethedral surface facets. Nucleation appears to occur at the pyramidal peaks, after which the nanowires begin to grow, with diameters at or below 200 nm and lengths up to 25 µm, after growth times of the order of 30 min.

Oxidization of Cu proceeds through reactions such as 4 $Cu+O_2 \rightarrow 2\ Cu_2O$ and 2 $CuO+O_2 \rightarrow 4\ CuO+Cu_2O$. Reduction of $Cu_2O$ proceeds through $Cu_2O)+H_2 \rightarrow 2\ Cu+H2O$. Reduction of CuO proceeds through a two-step process: 2 $CuO+H_2 \rightarrow Cu_2O+H_2O$ and reduction of $Cu_2O$ to Cu by the preceding reduction reactions. When an oxide is reduced, the volume is reduced. Nanowires with diameters 10-40 nm may disappear altogether: only Cu oxides with larger diameters appear to survive, with smaller volumes and with reduced lengths. Tops of the reduced nanowires become sharper, resembling a pencil tip. Oxide nanowires with smaller diameters complete the reduction process earlier than do oxide nanowires with larger diameters.

Peaks in $Cu_2O$ and CuO graphs occur after initial nanowire growth. An initial X-ray diffraction spectrum of the reduced nanowire returns to, or toward, a metallic Cu spectrum, with Cu—O bonding no longer present. Provision of growth temperatures below 600° C. appears to favor growth of CuO relative to growth of $Cu_2O$. After completion of the reduction process, the electrical resistance falls by about six orders of magnitude, indicating that the reduced nanowire composition is reasonably metallic. Cu nanowires, produced in this manner, can be oriented vertically or laterally (parallel to the substrate surface).

In summary, we have demonstrated growth of metallic copper nanowires by thermal oxidation of copper wire and chemical reduction of the copper oxide, which transforms the copper oxide into copper nanowires. The nanowires were oriented approximately normal to the substrate, and the substrate surface was fully covered by nanowires. The copper nanowires had diameters no greater than about 100 nm and lengths no greater than about 25 μm, respectively. Chemical reduction transforms the copper oxide wires into metallic copper nanowires. The results of EDX, XRD, and I-V measurement were consistent each other. The chemical reduction method is applicable for various metal oxide nanowires to produce inorganic nanowires.

What is claimed is:

1. A method for fabricating small diameter nanowires of metallic Cu, the method comprising:
  providing an array of Cu-containing structures, having diameters that are no greater than 1 mm and containing at least one oxide of Cu;
  exposing the array to a gas or vapor containing at least one of H and $H_2$ at a gas temperature of about 400° C. or higher, for a time interval length at least about 30 min.;
  allowing the array to react with the gas and to become reduced so that at least one of the Cu-containing structures containing at least one oxide of Cu becomes approximately pure Cu with a diameter in a range 20-100 nm;
  providing a substrate of copper having at least one exposed surface;
  heating the substrate to a temperature of about 400° C. or higher for a time interval of length about 30 min. or higher, and allowing formation on the substrate of at least one structure, having a diameter in a range of about 20-100 nm and having at least one molecule of $Cu_2O$ or CuO, on the substrate;
  orienting said Cu-containing structures in said array in a vertical direction that is approximately perpendicular to a surface of said substrate; and
  implementing at least one of said vertically oriented Cu-containing structures as a vertical interconnect in a circuit.

2. The method of claim 1, wherein said substrate is heated to a plateau temperature of at least about 400° C. with a temperature ramp-up time of at least about 30 min, followed by a plateau temperature that is approximately constant.

3. The method of claim 2, wherein said substrate is held at said plateau temperature for a time interval of length at least about 60 min.

4. The method of claim 1, further comprising permitting said temperature of said array to decrease toward room temperature at a temperature reduction rate that is approximately equal to cooling in ambient air, whereby said at least one of the Cu-containing structures does not develop a crack.

5. The method of claim 1, further comprising orienting at least one of said Cu-containing structures in said array in a lateral direction that is approximately parallel to a surface of said substrate.

6. The method of claim 1, further comprising growing at least one of said Cu-containing structures with a length no greater than about 25 nm.

7. The method of claim 1, further comprising providing at least one of said Cu-containing structures with a diameter of at least 40 nm, before said array is exposed to said gas or vapor containing at least one of H and $H_2$.

8. The method of claim 1, wherein allowing the array to react with the gas includes removing at least one of O and $O_2$ atoms and molecules from at least one of the Cu-containing structures.

9. The method of claim 1, wherein the circuit is located in at least one of a probe for an atomic force microscope, a scanning tunneling microscope, a photodetector, and a solar cell.

* * * * *